(12) United States Patent
Zhang et al.

(10) Patent No.: US 12,321,158 B2
(45) Date of Patent: Jun. 3, 2025

(54) PRODUCT QUALITY PREDICTION METHOD BASED ON DUAL-CHANNEL INFORMATION COMPLEMENTARY FUSION STACKED AUTO-ENCODER

(71) Applicant: ZHEJIANG UNIVERSITY, Zhejiang (CN)

(72) Inventors: Xinmin Zhang, Hangzhou (CN); Hongyu Zhu, Hangzhou (CN); Bocun He, Hangzhou (CN); Zhihuan Song, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 40 days.

(21) Appl. No.: 18/354,595

(22) Filed: Jul. 18, 2023

(65) Prior Publication Data

US 2024/0094716 A1    Mar. 21, 2024

Related U.S. Application Data

(63) Continuation of application No. PCT/CN2022/119575, filed on Sep. 19, 2022.

(51) Int. Cl.
G06N 3/04 (2023.01)
G05B 19/418 (2006.01)
(Continued)

(52) U.S. Cl.
CPC ... *G05B 19/41875* (2013.01); *G05B 19/4183* (2013.01); *G06N 3/045* (2023.01); *G06N 3/0455* (2023.01)

(58) Field of Classification Search
CPC .................................................. G06N 3/0455
See application file for complete search history.

(56) References Cited

U.S. PATENT DOCUMENTS

2022/0113695 A1    4/2022    Liu et al.

FOREIGN PATENT DOCUMENTS

| AU | 2020102208 A4 | 10/2020 |
|---|---|---|
| CN | 112257341 A | 1/2021 |
| CN | 114004346 A | 2/2022 |

OTHER PUBLICATIONS

Park, "Dual Autoencoder Network for Retinex-Based Low-Light Image Enhancement", IEEE, 2018 (Year: 2018).*

(Continued)

*Primary Examiner* — Van C Mang
(74) *Attorney, Agent, or Firm* — Wiersch Law Group

(57) ABSTRACT

The present application discloses a product quality prediction method based on a dual-channel information complementary fusion stacked auto-encoder. According to the present method, the design of a stacked auto-encoder is firstly adopted, and the input data information is received and trained to obtain the information of a hidden layer of the stacked auto-encoder. Then, outside the stacked auto-encoder, a structure of an information complementary fusion module and a down-to-top and top-to-down dual-channel information fusion layer is designed, which can use the information of the hidden layer inside the stacked auto-encoder and transmit the information in two directions. Furthermore, the output value and output information of the module are calculated through a gating module and is subjected to weighted fusion to obtain a final product quality prediction result. This method extracts more effective information, reduces noise, improves the utilization efficiency of information, and has better ability to predict product quality.

6 Claims, 5 Drawing Sheets

(51) Int. Cl.
　　　*G06N 3/045*　　　(2023.01)
　　　*G06N 3/0455*　　(2023.01)

(56) References Cited

OTHER PUBLICATIONS

Bhagat, "Multimodal Sensor Fusion Using Symmetric Skip Autoencoder via an Adversarial Regulariser", IEEE, 2021 (Year: 2021).*
Bo Du, "Stacked Convolutional Denoising Auto-Encoders for Feature Representation", IEEE, 2017 (Year: 2017).*
Bai, "SSDC-DenseNet: A Cost-Effective End-to-End Spectral-Spatial Dual-Channel Dense Network for Hyperspectral Image Classification", 2019 (Year: 2019).*
International Search Report (PCT/CN2022/119575); Date of Mailing: Apr. 14, 2023.

* cited by examiner

PRODUCT QUALITY PREDICTION METHOD BASED ON DUAL-CHANNEL INFORMATION COMPLEMENTARY FUSION STACKED AUTO-ENCODER

CROSS-REFERENCE TO RELATED APPLICATIONS

The present application is a continuation of International Application No. PCT/CN2022/119575, filed on Sep. 19, 2022, the content of which is incorporated herein by reference in their entirety

TECHNICAL FIELD

The present application belongs to the field of industrial process control, in particular to a product quality prediction method based on a dual-channel information complementary fusion stacked auto-encoder.

BACKGROUND

With the continuous development and progress of modern industrial technology, how to ensure the quality of products in industrial production has become one of the key issues that need to be solved in the field of industrial process control. In the process of industrial production, real-time measurement and accurate prediction of product quality variables are crucial for employees. The state of production process can be monitored in real time by the change of quality variables, the process control strategy can be adjusted in time, production costs are reduced, production efficiency is improved, and product quality is optimized. With the continuous development and progress of modern measurement methods, more data can be obtained through measurement during the process, and a large amount of data has been accumulated in the industrial production process. The data describes the real situation of each production stage of manufacturing, provides valuable data resources for understanding, analyzing and optimizing the manufacturing process, and is an intelligent source to realize intelligent manufacturing. Therefore, how to reasonably use the data information accumulated in the manufacturing process to establish an intelligent analysis model suitable for the industrial process, so as to better serve the intelligent decision-making and quality control of the manufacturing process, is a hot issue of concern to the industry. At present, the models suitable for product quality prediction in industrial process mainly include mechanism-based modeling, expert experience-based modeling and data-driven modeling. Because industrial process systems are often in a complex black box state, data-driven models have become the main research direction in recent years, and also have better prediction results. A data-driven quality prediction method uses intelligent analysis technologies such as machine learning and deep learning to deeply mine, model and analyze industrial data, and provide real-time and accurate product quality prediction results for users and industries. As a black-box model, data-driven model can solve the problem that the mechanism of the studied object is ambiguous. The data-driven model can be established by only one algorithm, or by integrating multiple algorithms. At the same time, the algorithm used in the data-driven model can flexibly adjust the internal superparameter according to the actual problem or be improved by using the optimization algorithm. A data-driven model is usually established by using historical data, which aims to describe the internal operation law of the research object and the difference between related modes, and can realize the online output of the model by combining the parameter input of online data. However, some existing data-driven modeling methods are not perfect in the processing and utilization of industrial process data information, and the utilization rate of effective information is low. Therefore, it is desired to provide a product quality prediction method with better utilization rate of data information, so that the model can extract effective information more effectively, suppress noise and improve the accuracy and efficiency of product quality prediction.

SUMMARY

The object of the present application is to provide a product quality prediction method based on a dual-channel information complementary fusion stacked auto-encoder; the method includes the following steps.

A product quality prediction method based on a dual-channel information complementary fusion stacked auto-encoder includes the following steps:

Step 1: collecting sensor data and product quality data of an industrial process to obtain a training data set $S_l = \{x_i, y_i\}_{i=l}^{M}$, where, x represents an input sample, y represents a sample label, and M represents a number of labeled samples.

Step 2: constructing the dual-channel information complementary fusion stacked auto-encoder model for product quality prediction, and training the dual-channel information complementary fusion stacked auto-encoder model by using the training data set.

In an embodiment, the dual-channel information complementary fusion stacked auto-encoder model comprises a stacked auto-encoder, a top-down fusion channel, a down-top fusion channel and a gating module.

The top-down fusion channel comprises a plurality of information complementary fusion modules; the information complementary fusion module uses hidden layer information of the stacked auto-encoder to perform information fusion, and uses the fused information to obtain an output value of the corresponding information complementary fusion module; at the same time, the fused information is transmitted to a lower layer.

The down-top fusion channel comprises a plurality of information complementary fusion modules; the information complementary fusion module uses the hidden layer information of the stacked auto-encoder to perform information fusion, and uses the fused information to obtain an output value of the corresponding information complementary fusion module; at the same time, the fused information is transmitted from the lower layer to the upper layer.

The gating module is used for collecting the fused information and the output values of a plurality of information complementary fusion modules in two fusion channels, then calculating weighst of the output values by using the fused information, and finally performing weighted sum using the weights and the output values to obtain an overall prediction result of the dual-channel information complementary fusion stacked auto-encoder model.

Step 3: collecting industrial field work data and inputting the industrial field work data into the trained dual-channel information complementary fusion stacked auto-encoder model, so that the trained dual-channel information complementary fusion stacked auto-encoder model outputs a corresponding product quality prediction result.

Further, in the step 2, a structure of the stacked auto-encoder comprises a multi-layer encoder and a multi-layer decoder, and an output of each layer of the stacked auto-encoder is a reconstruction of the input.

For a single-layer auto-encoder, a calculation formula is as follows:

$$h = f_{SAE}^{(e)}(W^{(e)}x + b^{(e)}) \quad (1)$$

$$\tilde{x} = f_{SAE}^{(d)}(W^{(d)}h + b^{(d)}) \quad (2)$$

where $f_{SAE}^{(e)}$ represents an encoder function, $f_{SAE}^{(d)}$ represents a decoder function, x represents an input data set, h represents an output of the encoder and an input of the decoder, $\tilde{x}$ represents an output of the decoder; $W^{(e)}$, $W^{(d)}$ represent weight coefficient matrices of the encoder and the decoder, and $b^{(e)}$, $b^{(d)}$ represent deviation coefficient matrices of the encoder and the decoder.

For the stacked auto-encoder, an output of an upper encoder is used as an input of a lower encoder, and a calculation formula is as follows:

$$h_L = f_{SAE}^{(e)}(W_L^{(e)}h_{L-1} + b_L^{(e)}) \quad (3)$$

where L represents a number of hidden layers, and $W_L^{(e)}$ and $b_L^{(e)}$ represent a weight coefficient matrix and a deviation coefficient matrix of a corresponding hidden layer, respectively.

Further, the information complementary fusion module comprises a dimension-descending fusion channel, a dimension-ascending fusion channel and a regressor. In an embodiment, high-dimensional information passes through the dimension-descending fusion channel and low-dimensional information passes through the dimension-ascending fusion channel.

In an embodiment, a calculation formula of dimension-descending fusion is:

$$h_i^r = f_{DR}(W_i^{DR}h_i + b_i^{DR}) \quad (4)$$

$$\hat{h}_j = h_i^r + h_j \quad (5)$$

where, $f_{DR}$ represents a function of the dimension-descending fusion channel, $h_i$ represents high-dimensional information, $h_j$ represents low-dimensional information, and $h_i^r$ represents the information after dimension descending of $h_i$, $\hat{h}_j$ represents the fused information; $W_i^{DR}$ and $b_i^{DR}$ represent a weight coefficient matrix and a deviation coefficient matrix, respectively.

A calculation formula of dimension-ascending fusion satisfies:

$$h_j^r f_{DA}(W_j^{DA}h_j + b_j^{DA}) \quad (6)$$

$$\hat{h}_i = h_j^r + h_i \quad (7)$$

where $f_{DA}$ represents a function of the dimension-ascending fusion channel, $h_j^r$ represents the information after dimension increasing of $h_j$, and $W_j^{DA}$ and $b_j^{DA}$ represent a weight coefficient matrix and a deviation coefficient matrix, respectively; $\hat{h}_i$ represents the fused information.

The fused information is regressed to obtain corresponding module output values $\hat{y}_{ij}$ and $\hat{y}_{ji}$, and calculation formulas of the module output values $\hat{y}_{ij}$ and $\hat{y}_{ji}$ are as follows:

$$\hat{y}_{ij} = f_R(W_j^R\hat{h}_j + b_j^R) \quad (8)$$

$$\hat{y}_{ji} = f_R(W_i^R\hat{h}_i + b_i^R) \quad (9)$$

where $f_R$ represents a regression function, and $W_i^R$, $W_j^R$ and $b_i^R$, $b_j^R$ represent weight coefficient matrices and deviation coefficient matrices of the regression function, respectively.

Further, expressions of the down-top fusion channel for information transmission are:

$$h_{1,2}^{bt} = f_{ICFB-bt}(h_1, h_2) \quad (10)$$

$$h_{n,n+1}^{bt} = f_{ICFB-bt}(h_{n+1}, h_{n-1,n}^{bt}) n = 2,3, \ldots, L-1 \quad (11)$$

where $f_{ICFB}$ represents a functional expression of the information complementary fusion module.

Expressions of the top-down fusion channel for information transmission are:

$$h_{L,L-1}^{bt} = f_{ICFB-bt}(h_L, h_{L-1}) \quad (12)$$

$$h_{n,n-1}^{bt} = f_{ICFB-bt}(h_{n-1}, h_{n+1,n}^{tb}) \quad (13)$$

Further, an expression for calculating a weight of an output value by the gating module using the fused information is as follows:

$$W_k^g = g_k(W_{g,k}h_k + b_{g,k}) \quad (14)$$

where $g_k$ represents a gating function, and $W_{g,k}$ and $b_{g,k}$ represent a weight coefficient matrix and a deviation coefficient matrix output by the corresponding module, respectively.

A calculation expression of the overall prediction result of the model obtained by the weighted sum of the gating module by using the weight and the output value is as follows:

$$\hat{y}_{total} = \hat{y}_{bt} + \hat{y}_{tb} = \sum_{i=1}^{L}(W_{i,i+1}^g \hat{y}_{i,i+1}) + \sum_{i=2}^{L}(W_{i,i-1}^g \hat{y}_{i,i-1}) \quad (15)$$

Further, in the step 2, the dual-channel information complementary fusion stacked auto-encoder is trained by a random gradient descent algorithm, and a model training loss function thereof is a mean square error function; an expression is as follows:

$$MSE = \frac{1}{M}\sum_{i=1}^{M}(x_i - \hat{x}_i)^2 \quad (16)$$

where, $x_i$ represents an $i^{th}$ data and $\hat{x}_i$ represents reconstruction of the data by the stacked auto-encoder.

The present application has the following beneficial effects.

In view of the problem that the existing product quality prediction model has low utilization rate of industrial process data information, the present application provides a product quality prediction method based on a dual-channel information complementary fusion stacked auto-encoder. In this method, a top-down fusion channel, a down-top fusion channel and a gating module are designed outside the stacked auto-encoder, and both fusion channels include a plurality of information complementary fusion modules, which can use the hidden layer information inside the stacked auto-encoder and carry out fusion transmission in two directions, so as to strengthen the integration of effective information. Furthermore, the output value and information of the information complementary fusion module are calculated and weighted by the gating module, which improves the adaptability and prediction accuracy of the model.

DESCRIPTION OF EMBODIMENTS

The object and effect of the present application will become more apparent by describing the present application in detail according to the attached drawings and preferred embodiments. It should be understood that the specific embodiments described here are only for explaining the present application and are not used to limit the present application.

In view of the problem that the existing product quality prediction model has low utilization rate of industrial process data information, the present application provides a product quality prediction method based on a dual-channel information complementary fusion stacked auto-encoder. According to the present method, the design of a stacked auto-encoder is firstly adopted, and the input data information is received and trained to obtain the information of a hidden layer of the stacked auto-encoder. Then, outside the stacked auto-encoder, a structure of an information complementary fusion module and a bottom-to-top and top-to-bottom dual-channel information fusion layer is designed, which can use the information of the hidden layer inside the stacked auto-encoder and perform fusion transmission of information in two directions. Furthermore, the output value and output information of the module are calculated through a gating module and is subjected to weighted fusion to obtain a final product quality prediction result. The design of the model enables the model to extract and utilize information more effectively, strengthen the utilization rate of effective information, suppress noise and improve the effect of product quality prediction.

The method of the present application includes the following specific steps:

In step 1, sensor data and product quality data of an industrial process are collected to obtain a training data set $S_l=\{x_i, y_i\}_{i=1}^{M}$, where, x represents an input sample, y represents a sample label, and M represents a number of labeled samples.

In step 2, a dual-channel information complementary fusion stacked auto-encoder model is constructed for product quality prediction, and the dual-channel information complementary fusion stacked auto-encoder model is trained y using the training data set in the industrial process.

Figure 1:
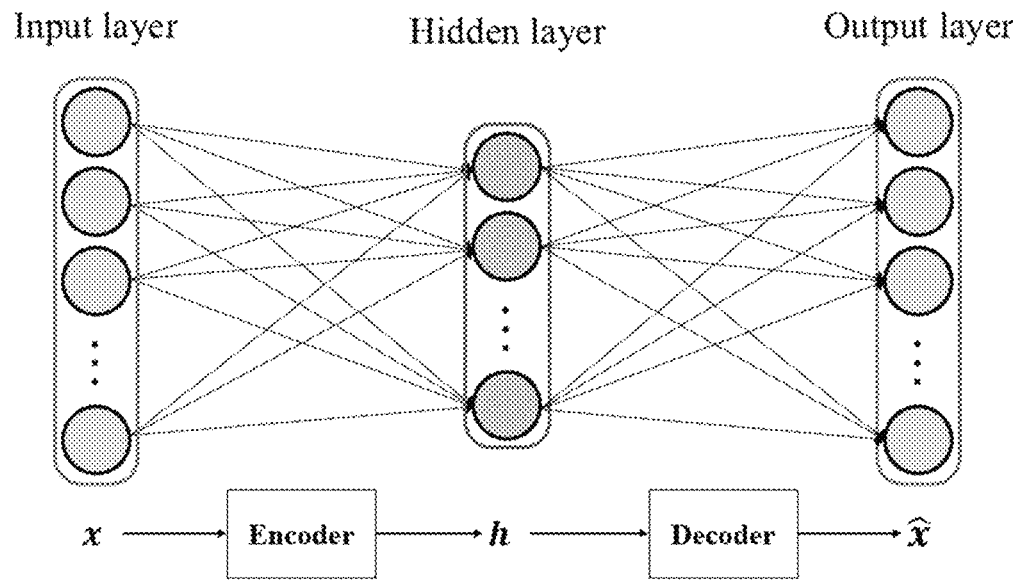
FIG. 1 is a schematic diagram of an auto-encoder.
Figure 2:
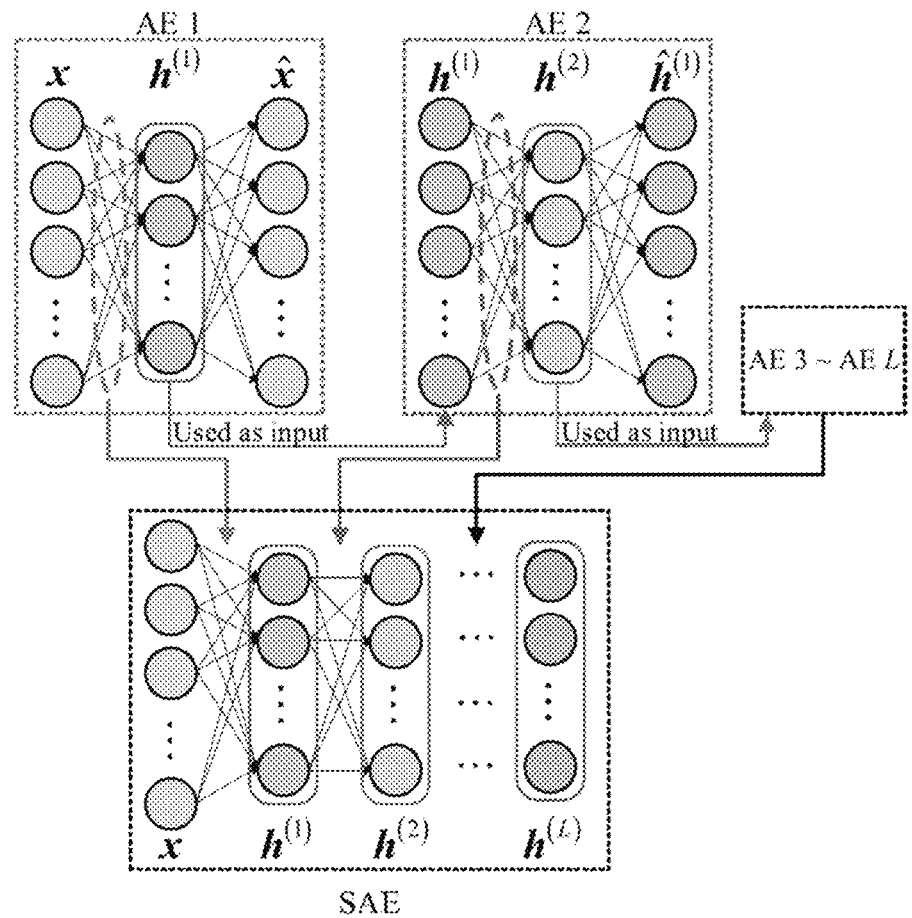
FIG. 2 is a schematic diagram of a stacked auto-encoder.

(2.1) The constructed stacked auto-encoder model includes a multi-layer encoder and a multi-layer decoder, and an output of each layer of the stacked auto-encoder is a reconstruction of the input; for a single-layer auto-encoder, as shown in FIG. 1, a calculation formula is as follows:

$$h = f_{SAE}^{(e)}(W^{(e)}x + b^{(e)}) \quad (1)$$

$$\tilde{x} = f_{SAE}^{(d)}(W^{(d)}h + b^{(d)}) \quad (2)$$

$$J_{AE}(\theta) = \min \frac{1}{2M}\sum_{i=1}^{M}\|x_i - \hat{x}_i\|^2 \quad (3)$$

where $f_{SAE}^{(e)}$ represents an encoder function, $f_{SAE}^{(d)}$ represents a decoder function, x represents an input data set, h represents an output of the encoder and an input of the decoder, x̃ represents an output of the decoder; $W^{(e)}$, $W^{(d)}$ represent weight coefficient matrices of the encoder and the decoder, and $b^{(e)}$, $b^{(d)}$ represent deviation coefficient matrices of the encoder and the decoder; $J_{AE}(\theta)$ represents the mean square error formula used in the training process of a single-layer auto-encoder, and it is desirable that the closer to 0 the result of $J_{AE}(\theta)$, the better during training. For the stacked auto-encoder, the output of an upper encoder can be used as the output of a lower encoder, as shown in FIG. 2, and its calculation formula is as follows:

$$h_L = f_{SAE}^{(e)}(W_L^{(e)}h_{L-1} + b_L^{(e)}) \quad (4)$$

where L represents a number of hidden layers, and $W_L^{(e)}$ and $b_L^{(e)}$ represent a weight coefficient matrix and a deviation coefficient matrix of a corresponding hidden layer, respectively.

Figure 3:
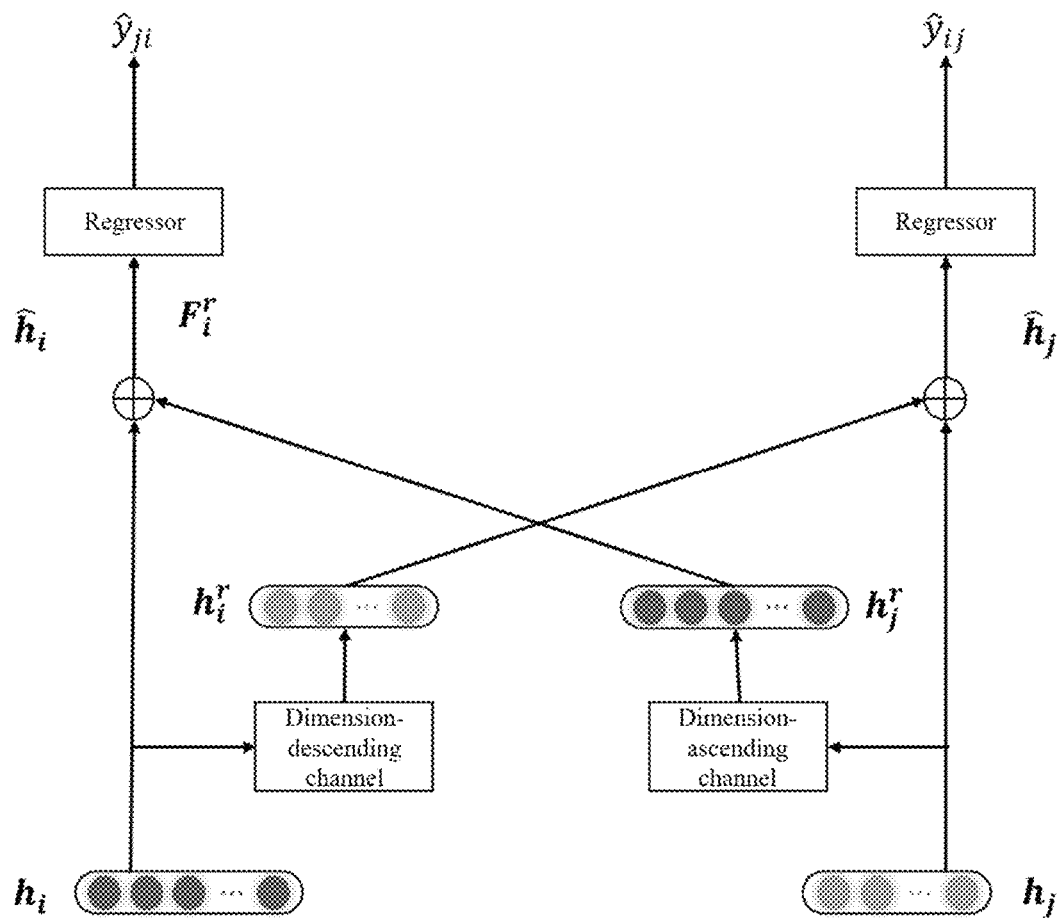
FIG. 3 is a schematic diagram of an information complementary fusion module.

(2.2) An information complementary fusion module is established to extract and fuse the hidden layer information in the stacked auto-encoder, and further transmit the fused information. The information complementary fusion module includes a dimension-descending fusion channel, a dimension-ascending fusion channel and a regressor. As shown in FIG. 3, the information complementary fusion module extracts and collects two different pieces of information, in which $h_i$ is high-dimensional information and $h_j$ is low-dimensional information. The high-dimensional information is reduced to a dimension equivalent to the low-dimensional information through the dimension-descending fusion channel, and the low-dimensional information is upgraded to a dimension of the high-dimensional information through the dimension-ascending fusion channel, so as to achieve dimensional unification through the two channels, and then the information with the same dimension is fused to obtain the fused information. The fused information includes both high-dimensional information and low-dimensional information.

the calculation formula of dimension reduction fusion channel is:

$$h_i^r f_{DR}(W_i^{DR}h_i + b_i^{DR}) \quad (5)$$

$$\hat{h}_j = h_i^r + h_j \quad (6)$$

where $f_{DR}$ represents a function of the dimension-descending fusion channel, $h_i^r$ represents the information after dimension descending of $h_i$, $\hat{h}_j$ represents the fused information; $W_i^{DR}$ and $b_i^{DR}$ represent a weight coefficient matrix and a deviation coefficient matrix, respectively.

In addition, the calculation formula of the dimension increasing fusion channel is:

$$h_j^r f_{DA}(W_j^{DA}h_j + b_j^{DA}) \quad (8)$$

$$\hat{h}_i = h_i^r + h_l \quad (8)$$

where, $f_{DA}$ represents a function of the dimension increasing fusion channel, $h_j^r$ represents the information after dimension increasing of $h_j$, $\hat{h}_i$ represents the fused information; $W_j^{DA}$ and $b_j^{DA}$ represent a weight coefficient matrix and a deviation coefficient matrix, respectively.

The fused information is regressed to obtain corresponding module output values $\hat{y}_{ij}$ and $\hat{y}_{ji}$, and a calculation formula thereof is as follows:

$$\hat{y}_{ij} = f_R(W_j^R \hat{h}_j + b_j^R) \quad (9)$$

$$\hat{y}_{ji} = f_R(W_i^R \hat{h}_i + b_i^R) \quad (10)$$

where $f_R$ represents a regression function, and $W_i^R$, $W_j^R$ and $b_i^R$, $b_j^R$ represent weight coefficient matrices and deviation coefficient matrices of the regression function, respectively.

Figure 4:
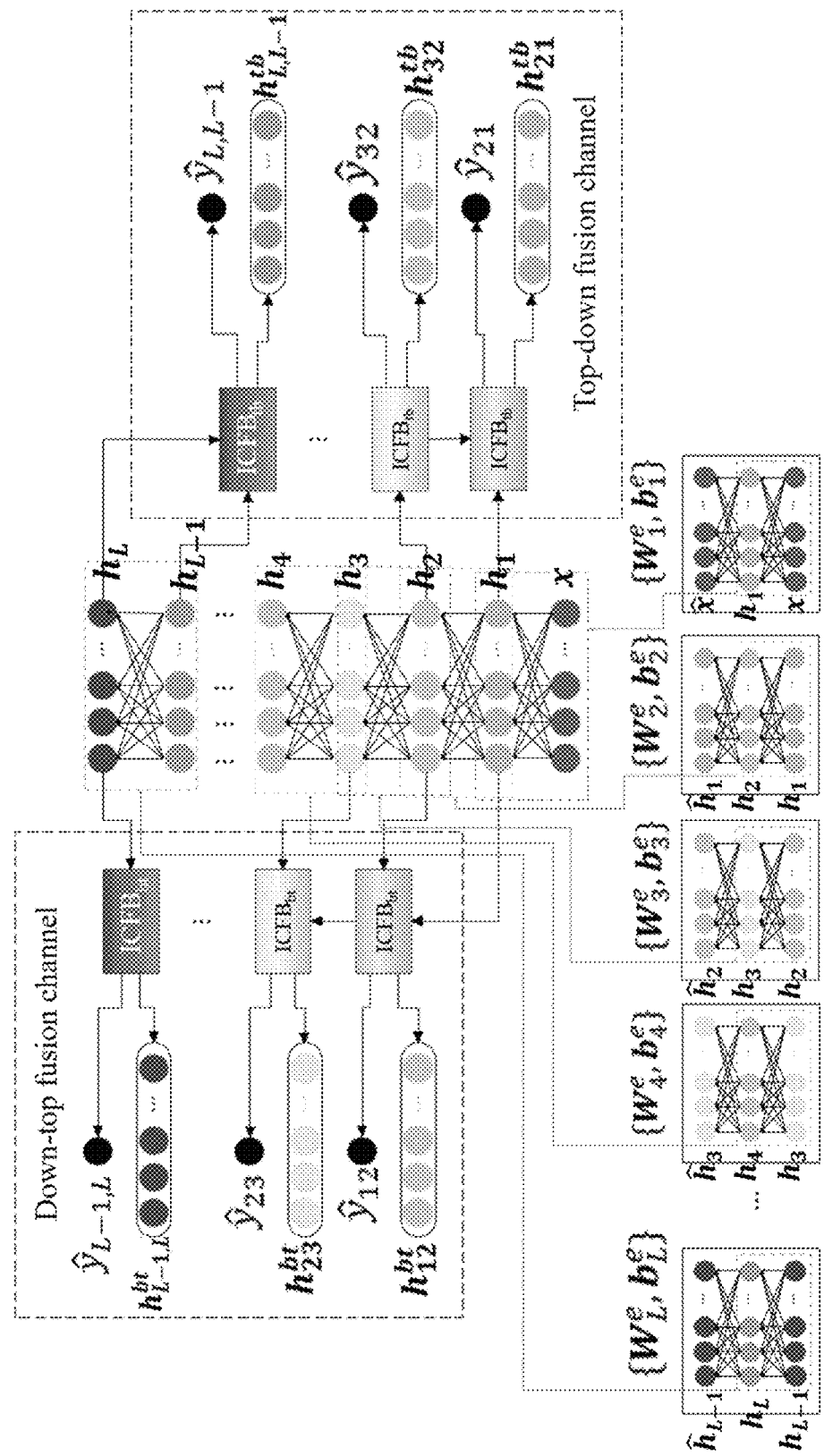
FIG. 4 is a schematic diagram of a dual-channel information complementary fusion stacked auto-encoder.

(2.3) For the fused information obtained extracting and fusing by the information complementary fusion module, the present application designs a top-down fusion channel and a down-top fusion channel to complete the information extraction, fusion and directional transmission of the whole stack. The specific structure of these two channels is shown in FIG. 4, and the expression of the down-top fusion channel for information transmission is as follows:

$$h_{1,2}^{bt} = f_{ICFB\text{-}bt}(h_1, h_2) \quad (11)$$

$$h_{n,n+1}^{bt} = f_{ICFB\text{-}bt}(h_{+1}, h_{n-1,n_{bt}}) \, n=2,3,\ldots,L-1 \quad (12)$$

where, $f_{ICFB}$ represents the function expression of the information complementary fusion module. In the down-top information fusion and transmission channel, firstly, the lowest information complementary fusion module uses the information of the lowest two adjacent hidden layers $h_1$ and $h_2$, and obtains the fused information $h_{1,2}^{bt}$ through fusion; then the lowest information fusion module transmits the fused information to the second information complementary fusion module from bottom to top, and at the same time, the second information complementary fusion module uses the third hidden layer information $h_3$. After information fusion, $h_{1,2}^{bt}$ and $h_3$ are transmitted to the third information complementary fusion module from bottom to top, and so on. Extraction, fusion and transmission of the hidden layer information in the stacked auto-encoder are completed from the lower layer to the upper layer.

The expression of the top-down fusion channel for information transmission is:

$$h_{L,L-1}^{tb} = f_{ICFB\text{-}tb}(h_L, h_{L-1}) \quad (13)$$

$$h_{n,n-1}^{tb} = f_{ICFB\text{-}tb}(h_{n-1}, h_{n+1,n}^{tb}) \, n=L-1, L-2, \ldots, 2 \quad (14)$$

where, $f_{ICFB}$ represents the function expression of the information complementary fusion module. In the top-down information fusion and transmission channel, firstly, the top-level information complementary fusion module uses the information of the top two adjacent hidden layers $h_L$ and $h_{L-1}$, and the fused information $h_{L,L-1}^{bt}$ is obtained after fusion. Then, the top information fusion module transmits the fused information to the second information complementary fusion module from top to bottom, and at the same time, the second information complementary fusion module uses the information $h_{L-2}$ of the $L-2^{th}$ hidden layer. After information fusion, $h_{L,L-1}^{bt}$ and $h_{L-2}$ are transmitted to the third information complementary fusion module from top to bottom, and so on. Extraction, fusion and transmission of the hidden layer information in the stacked auto-encoder are completed from the upper layer to the lower layer.

(2.4) The expression for calculating the weight of the output value by the gating module using the fused information is as follows:

$$W_k^g = g_k(W_{g,k} h_k + b_{g,k}) \quad (15)$$

where, $g$ $k$ represents a gating function, $W_{g,k}$ and $b_{g,k}$ represents the weight coefficient matrix and deviation coefficient matrix output by the corresponding module, respectively.

Figure 5:
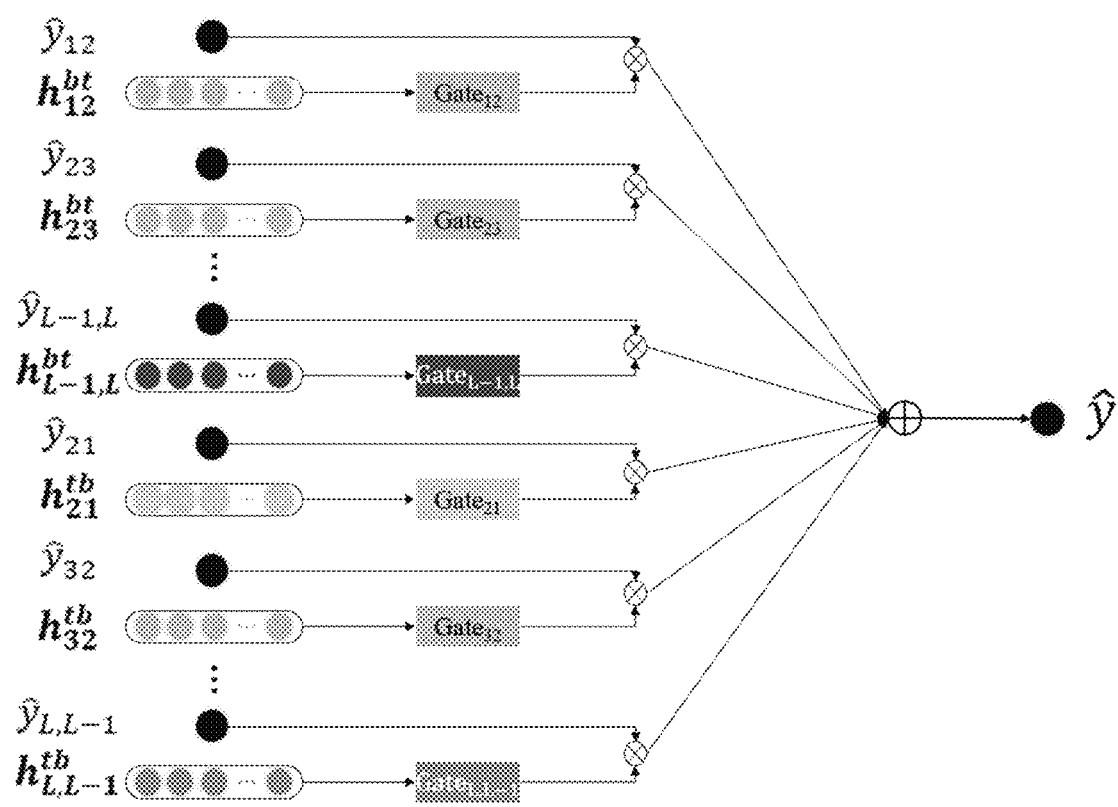
FIG. 5 is a schematic structural diagram of a gating module.

The specific structure of the gating module is shown in FIG. 5. When calculating the overall prediction result of the model, the overall prediction structure includes two parts, one part is the weighted fusion of the output value and the calculated weight of each information complementary fusion module in the top-down information fusion and transmission channel, and the other part is the weighted fusion of the output value and the calculated weight of each information complementary fusion module in the down-top information fusion and transmission channel. The calculation expression of the overall prediction result of the model is as follows.

$$\hat{y}_{total} = \hat{y}_{bt} + \hat{y}_{tb} = \sum_{i=1}^{L}(W_{i,i+1}^g \hat{y}_{i,i+1}) + \sum_{i=2}^{L}(W_{i,i-1}^g \hat{y}_{i,i-1}) \quad (16)$$

where, $\hat{y}_{bt}$ is the weighted fusion of the output value and the calculated weight of each information complementary fusion module in the down-top information fusion and transmission channel; $\hat{y}_{tb}$ is the weighted fusion of the output value and the calculated weight of each information complementary fusion module in the top-down information fusion and transmission channel.

(2.5) The industrial process sample data set constructed in step 1 is adopted, the dual-channel gated multi-expert hybrid stacked auto-encoder model is trained by the random gradient descent algorithm, and its model training loss function is the mean square error function (MSE); the expression is as follows:

$$MSE = \frac{1}{M}\sum_{i=1}^{M}(x_i - \hat{x}_i)^2 \quad (17)$$

where, $x_i$ represents the $i^{th}$ data and $\hat{x}_i$ represents the reconstruction of the data by the stacked auto-encoder.

Step 3, industrial field work data are collected and input into the dual-channel information complementary fusion stacked auto-encoder model for product quality prediction, and the corresponding product quality prediction results are output.

The effectiveness of the method of the present application is verified by a specific industrial process example. In the experiment, the sensor data of blast furnace ironmaking in the actual production process were collected and the data were collected. There were 110 process variables in the data set, and the quality variable to be predicted was silicon content, which is one of the important quality indexes of hot metal in blast furnace ironmaking process and can well reflect the operation state and product quality of blast furnace ironmaking industrial system.

The collected data includes 20,000 pieces of data, including 12,000 pieces of data as a training set, 4,000 pieces of data as a verification set and 4,000 pieces of data as a test set. The training data set is used for model training, the verification data set is used for model parameter selection, and the test data set is used for model testing. In order to evaluate the prediction performance of the designed product quality prediction model, there are two main evaluation criteria used in the experiment, one of which is root mean square error, which is defined as follows:

$$RMSE = \sqrt{\frac{\sum_{i=1}^{N}(y_i - \hat{y}_i)^2}{N}} \quad (18)$$

where, N represents the total data volume of the test set, $y_i$ and $\hat{y}_i$ represent the real value and predicted value of the output quality variable, respectively. Another evaluation criterion is a determination coefficient, $R^2$ for short, which is defined as follows:

$$R^2 = 1 - \frac{\sum_{i=1}^{N}(\hat{y}_i - y_i)^2}{\sum_{i=1}^{N}(y_i - \bar{y}_i)^2} \quad (19)$$

where, $\bar{y}_i$ represents the average value of quality variables. For the above evaluation criteria, the smaller the RMSE value and larger the $R^2$, the higher the prediction performance of the model.

The test results of comparative experiments are shown in Table 1, where SAE stands for a stacked auto-encoder model, GSAE stands for a gated multi-expert hybrid stacked auto-encoder model, and DC-ICF-SAE stands for a dual-channel information complementary fusion stacked auto-encoder model of the present application. As can be seen from Table 1, compared with SAE and GSAE models, the DC-ICF-SAE model proposed by the present application obtains the minimum RMSE and the maximum $R^2$, which indicates that the method of the present application has better prediction performance.

TABLE 1

| Model | RMSE | $R^2$ |
|---|---|---|
| SAE | 0.0401 | 0.9041 |
| GSAE | 0.0389 | 0.9185 |
| DC-ICF-SAE | 0.0286 | 0.9504 |

Figure 6:
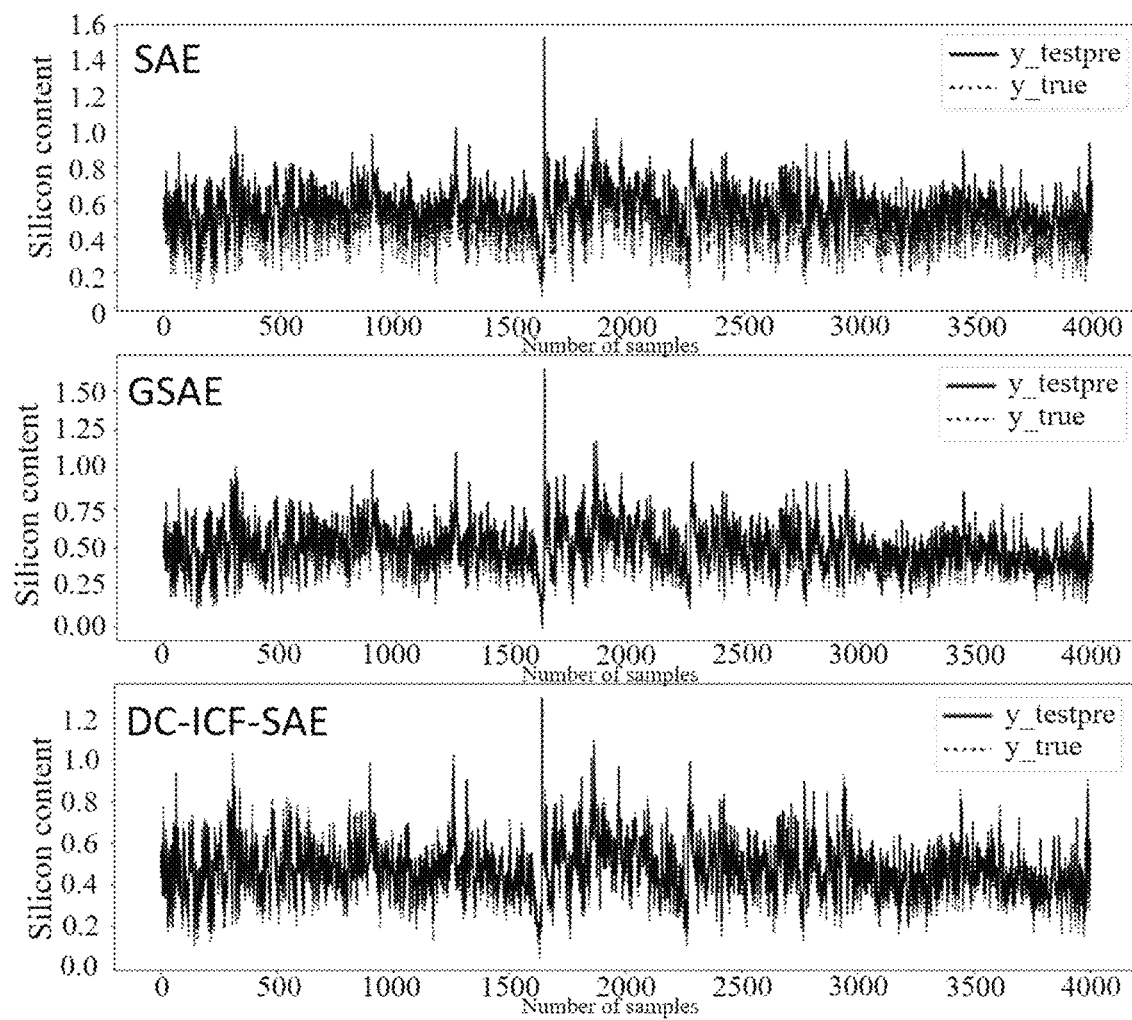
FIG. 6 is a graph of product quality prediction results of different models.

In addition, FIG. 6 shows the curves of product quality prediction results of SAE, GSAE and DC-ICF-SAE models. As can be seen from FIG. 6, there is obvious deviation between the predicted values output by SAE and GSAE models and the actual measured values, and the prediction effect is obviously reduced where the values of quality variables change rapidly. In contrast, the predicted value output by the DC-ICF-SAE model provided by the present application has a high degree of coincidence with the actual measured value, and has a better prediction effect in the part where the numerical value of the quality variable changes rapidly, and the prediction deviation is smaller. The experimental results show that the product quality prediction method based on the dual-channel information complementary fusion stacked auto-encoder provided by the present application better processes data information, extracts more effective information, and has better prediction effect on product quality.

It can be understood by those skilled in the art that the above is only a preferred example of the present application, and it is not used to limit the present application. Although the present application has been described in detail with reference to the above examples, it is still possible for those skilled in the art to modify the technical scheme described in the above examples or replace some technical features equally. Any modification and equivalent substitution within the spirit and principle of the present application should be included in the scope of protection of the present application.

What is claimed is:

1. A product quality prediction method based on a dual-channel information complementary fusion stacked auto-encoder, comprising:

step 1: collecting sensor data and product quality data of an industrial process to obtain a training data set $S_l = \{x_i, y_i\}_{i=1}^{M}$, where, x represents an input sample, y represents a sample label, and M represents a number of labeled samples;

step 2: constructing a dual-channel information complementary fusion stacked auto-encoder model for product quality prediction, and training the dual-channel information complementary fusion stacked auto-encoder model by using the training data set;

wherein the dual-channel information complementary fusion stacked auto-encoder model comprises a stacked auto-encoder, a top-down fusion channel, a down-top fusion channel, and a gating layer;

the top-down fusion channel comprises a plurality of information complementary fusion layers; the information complementary fusion layer uses hidden layer information of the stacked auto-encoder to perform information fusion, and uses the fused information to obtain an output value of the corresponding information complementary fusion layer; the fused information is transmitted to a lower layer;

the down-top fusion channel comprises a plurality of information complementary fusion layers; the information complementary fusion layer uses the hidden layer information of the stacked auto-encoder to perform information fusion, and uses the fused information to obtain an output value of the corresponding information complementary fusion layer; the fused information is transmitted from the lower layer to an upper layer;

the gating layer is used for collecting the fused information and the output values of a plurality of information complementary fusion layers in two fusion channels, then calculating weights of the output values by using the fused information, and finally performing weighted sum using the weights and the output values to obtain an overall prediction result of the dual-channel information complementary fusion stacked auto-encoder model; and step 3: collecting industrial field work data and inputting the industrial field work data into the trained dual-channel information complementary fusion stacked auto-encoder model, so that the trained dual-channel information complementary fusion stacked auto-encoder model outputs a corresponding product quality prediction result.

2. The product quality prediction method based on a dual-channel information complementary fusion stacked auto-encoder according to claim 1, wherein in the step 2, a structure of the stacked auto-encoder comprises multiple layers of encoders and multiple layers of decoders, and an output of each layer of the stacked auto-encoder is a reconstruction of the input;

for a single-layer auto-encoder, a calculation formula satisfies:

$$h = f_{SAE}^{(e)}(W^{(e)}x + b^{(e)}) \quad (1)$$

$$\tilde{x} = f_{SAE}^{(d)}(W^{(d)}h + b^{(d)}) \quad (2)$$

where $f_{SAE}^{(e)}$ represents an encoder function, $f_{SAE}^{(d)}$ represents a decoder function, x represents an input data set, h represents an output of the encoder and an input of the decoder, x̃ represents an output of the decoder; $W^{(e)}$, $W^{(d)}$ represent weight coefficient matrices of the encoder and the decoder, and $b^{(e)}$, $b^{(d)}$ represent deviation coefficient matrices of the encoder and the decoder;

for the stacked auto-encoder, an output of an upper encoder is used as an input of a lower encoder, and a calculation formula satisfies:

$$h_L = f_{SAE}^{(e)}(W_L^{(e)} h_{L-1} + b_L^{(e)}) \tag{3}$$

where L represents a number of hidden layers, and $W_L^{(e)}$ and $b_L^{(e)}$ represent a weight coefficient matrix and a deviation coefficient matrix of a corresponding hidden layer, respectively.

3. The product quality prediction method based on a dual-channel information complementary fusion stacked auto-encoder according to claim 2, wherein the information complementary fusion layer comprises a dimension-descending fusion channel, a dimension-ascending fusion channel and a regressor, wherein high-dimensional information passes through the dimension-descending fusion channel and low-dimensional information passes through the dimension-ascending fusion channel;

wherein, a calculation formula of dimension-descending fusion satisfies:

$$h_i^r = f_{DR}(W_i^{DR} h_i + b_i^{DR}) \tag{4}$$

$$\hat{h}_j = h_i^r + h_j \tag{5}$$

where, $f_{DR}$ represents a function of the dimension-descending fusion channel, $h_i$ represents high-dimensional information, $h_j$ represents low-dimensional information, and $h_i^r$ represents the information after dimension descending of $h_i$, $\hat{h}_j$ represents the fused information; $W_i^{DR}$ and $b_i^{DR}$ represent a weight coefficient matrix and a deviation coefficient matrix, respectively;

a calculation formula of dimension-ascending fusion satisfies:

$$h_j^r f_{DA}(W_j^{DA} h_j + b_j^{DA}) \tag{6}$$

$$\hat{h}_i = h_j^r + h_i \tag{7}$$

where $f_{DA}$ represents a function of the dimension-ascending fusion channel, $h_j^r$ represents the information after dimension increasing of $h_j$, and $W_j^{DA}$ and $b_j^{DA}$ represent a weight coefficient matrix and a deviation coefficient matrix, respectively; $\hat{h}_i$ represents the fused information;

the fused information is regressed to obtain corresponding module output values $\hat{y}_{ij}$ and $\hat{y}_{ji}$, and calculation formulas of the module output values $\hat{y}_{ij}$ and $\hat{y}_{ji}$ satisfy:

$$\hat{y}_{ij} = f_R(W_j^R \hat{h}_j + b_j^R) \tag{8}$$

$$\hat{y}_{ji} = f_R(W_i^R \hat{h}_i + b_i^R) \tag{9}$$

where $f_R$ represents a regression function, and $W_i^R$, $W_j^R$ and $b_i^R$, $b_j^R$ represent weight coefficient matrices and deviation coefficient matrices of the regression function, respectively.

4. The product quality prediction method based on a dual-channel information complementary fusion stacked auto-encoder according to claim 3, wherein, expressions of the down-top fusion channel for information transmission are:

$$h_{1,2}^{bt} = f_{ICFB-bt}(h_1, h_2) \tag{10}$$

$$h_{n,n+1}^{bt} = f_{ICFB-bt}(h_{n+1}, h_{n-1,n}^{bt}) n = 2, 3, \ldots, L-1 \tag{11}$$

where $f_{ICFB}$ represents a functional expression of the information complementary fusion layer;

expressions of the top-down fusion channel for information transmission are:

$$h_{L,L-1}^{bt} = f_{ICFB-bt}(h_L, h_{L-1}) \tag{12}$$

$$h_{n,n-1}^{bt} = f_{ICFB-bt}(h_{n-1}, h_{n+1,n}^{tb}) \tag{13}$$

5. The product quality prediction method based on a dual-channel information complementary fusion stacked auto-encoder according to claim 4, wherein, an expression for calculating a weight of an output value by the gating layer using the fused information satisfies:

$$W_k^g = g_k(W_{g,k} h_k + b_{g,k}) \tag{14}$$

where $g_k$ represents a gating function, and $W_{g,k}$ and $b_{g,k}$ represent a weight coefficient matrix and a deviation coefficient matrix output by the corresponding module, respectively;

a calculation expression of the overall prediction result of the model obtained by the weighted sum of the gating layer by using the weights and the output values satisfies:

$$\hat{y}_{total} = \hat{y}_{bt} + \hat{y}_{tb} = \sum_{i=1}^{L} (W_{i,i+1}^g \hat{y}_{i,i+1}) + \sum_{i=2}^{L} (W_{i,i-1}^g \hat{y}_{i,i-1}). \tag{15}$$

6. The product quality prediction method based on a dual-channel information complementary fusion stacked auto-encoder according to claim 5, wherein in the step 2, the dual-channel information complementary fusion stacked auto-encoder is trained by a random gradient descent algorithm, and a model training loss function is a mean square error function; an expression satisfies:

$$MSE = \frac{1}{M} \sum_{i=1}^{M} (x_i - \hat{x}_1)^2 \tag{16}$$

where $x_i$ represents an $i^{th}$ data, and $\tilde{x}_i$ represents reconstruction of the data by the stacked auto-encoder.

* * * * *